United States Patent
Sadana et al.

(10) Patent No.: US 10,652,126 B2
(45) Date of Patent: May 12, 2020

(54) SYSTEM AND METHOD OF A CLOUD SERVICE PROVIDER TRACER

(71) Applicant: Arista Networks, Inc., Santa Clara, CA (US)

(72) Inventors: Anshul Sadana, Santa Clara, CA (US); Fred Lo-Tze Hsu, Santa Clara, CA (US); Andre Pech, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 40 days.

(21) Appl. No.: 15/165,979

(22) Filed: May 26, 2016

(65) Prior Publication Data

US 2017/0250887 A1   Aug. 31, 2017

Related U.S. Application Data

(60) Provisional application No. 62/300,720, filed on Feb. 26, 2016.

(51) Int. Cl.
*H04L 12/26* (2006.01)
*H04L 12/24* (2006.01)

(52) U.S. Cl.
CPC ............ *H04L 43/10* (2013.01); *H04L 41/046* (2013.01); *H04L 43/045* (2013.01); *H04L 43/12* (2013.01); *H04L 41/5096* (2013.01)

(58) Field of Classification Search
CPC ....... H04L 43/10; H04L 43/12; H04L 43/045; H04L 41/046; H04L 41/5096

(Continued)

(56) References Cited

U.S. PATENT DOCUMENTS 9,152,470 B2 * 10/2015 Eksten ................. G06F 8/70
9,225,621 B2 * 12/2015 Tseitlin .................. H04L 43/08

(Continued)

FOREIGN PATENT DOCUMENTS

| EP | 2 728 428 A1 | 5/2014 |
| WO | 2013176918 A1 | 11/2013 |
| WO | WO2014-025344 A2 | 2/2014 |

OTHER PUBLICATIONS

PCT International Search Report and Written Opinion for PCT International Appln No. PCT/US2017/018986 dated May 24, 2017 (13 pages).

(Continued)

*Primary Examiner* — Kristie D Shingles
(74) *Attorney, Agent, or Firm* — Fountainhead Law Group P.C.

(57) ABSTRACT

A method and apparatus of a device that measures performance of a plurality of cloud service providers is described. In an exemplary embodiment, the device deploys a plurality of cloud agents to the plurality of cloud service providers. In addition, the device configures a controller to measure the performance of each of the plurality of cloud service providers using each plurality of cloud agents. The device further probes each of the plurality of cloud service providers by sending probe data to each of the plurality of cloud service providers. The device additionally receives response data from each of plurality of cloud agents, wherein the response data is indicative of performance measurements of the plurality of cloud service providers. Furthermore, the device measures the performance for each of the plurality of cloud service providers using the response data.

18 Claims, 7 Drawing Sheets

(58) Field of Classification Search
USPC .......................................................... 709/224
See application file for complete search history.

(56) References Cited

U.S. PATENT DOCUMENTS

| | | | |
|---|---|---|---|
| 9,411,787 B1* | 8/2016 | Lad | H04L 41/046 |
| 9,438,478 B1* | 9/2016 | Amulothu | H04L 43/0894 |
| 9,455,890 B2* | 9/2016 | Lad | H04L 41/042 |
| 9,485,273 B2* | 11/2016 | Karasaridis | H04L 63/1458 |
| 9,811,445 B2* | 11/2017 | Moretto | G06F 11/3672 |
| 9,912,563 B2* | 3/2018 | Agrawal | H04L 43/087 |
| 9,967,156 B2* | 5/2018 | Bednarz | G06Q 10/0639 |
| 2002/0177448 A1 | 11/2002 | Moran et al. | |
| 2013/0007261 A1 | 1/2013 | Dutta et al. | |
| 2013/0239089 A1* | 9/2013 | Eksten | G06F 8/70 717/120 |
| 2014/0123129 A1 | 5/2014 | Risbood et al. | |
| 2014/0278807 A1 | 9/2014 | Bohacek | |
| 2015/0263960 A1* | 9/2015 | Kasturi | H04L 47/22 370/230.1 |
| 2015/0263968 A1 | 9/2015 | Kumar | |
| 2015/0281006 A1 | 10/2015 | Kasturi et al. | |
| 2015/0281453 A1* | 10/2015 | Maturana | H04M 3/5233 379/265.12 |
| 2016/0099853 A1* | 4/2016 | Nedeltchev | H04L 43/0852 370/253 |
| 2016/0149769 A1* | 5/2016 | Joshi | H04L 41/5006 715/739 |
| 2016/0179993 A1* | 6/2016 | Maturana | G06F 17/5009 703/7 |
| 2017/0031670 A1* | 2/2017 | Savio | G06F 8/61 |
| 2017/0097841 A1* | 4/2017 | Chang | G06F 9/45558 |

OTHER PUBLICATIONS

Related European Application EP 17 75 7157, Search Report dated Sep. 2, 2019.

* cited by examiner

SYSTEM AND METHOD OF A CLOUD SERVICE PROVIDER TRACER

RELATED APPLICATIONS

Applicant claims the benefit of priority of prior, co-pending provisional application Ser. No. 62/300,720, filed Feb. 26, 2016, the entirety of which is incorporated by reference.

FIELD OF INVENTION

This invention relates generally to data networking, and more particularly, to tracing data and to measuring performance of a cloud service provider.

BACKGROUND OF THE INVENTION

An enterprise may have multiple data centers that are used to support operations of the enterprise. For example, the enterprise may use a data center for e-commerce, online transactions, database transactions, enterprise resource planning, and/or various other types of operations of the enterprise. In one embodiment, a data center is a facility used to house computer systems, networking equipment, storage system, and/or other types of equipment for an enterprise. Each of the data centers can house up to thousands of devices, where each of the devices can be a computer system, networking equipment, storage system, or some other type of device used in a data center.

A customer, such as a large enterprise that has their own data center(s), may also use one or more services provided by one or more cloud service providers to enhance or supplement the services provided by the customer's data center(s). A problem can arise if the customer uses multiple services from different cloud service providers. If one or more of the cloud service providers are down or having performance issues, it can be hard for the enterprise to track down where the performance problem lies. For example, an enterprise may use one cloud service provider for a first service and other cloud service providers for a second service. If this enterprise notices that there is a performance problem (e.g., slow or nonexistent service) for either of the first and second services, it may be difficult for the enterprise to track down whether the problem is within the enterprise's data center or within the cloud service providers that are supporting these services.

SUMMARY OF THE DESCRIPTION

A method and apparatus of a device that measures performance of a plurality of cloud service providers is described. In an exemplary embodiment, the device deploys a plurality of cloud agents to the plurality of cloud service providers. In addition, the device configures a controller to measure the performance of each of the plurality of cloud service providers using each plurality of cloud agents. The device further probes each of the plurality of cloud service providers by sending probe data to each of the plurality of cloud service providers. The device additionally receives response data from each of plurality of cloud agents, wherein the response data is indicative of performance measurements of the plurality of cloud service providers. Furthermore, the device measures the performance for each of the plurality of cloud service providers using the response data.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
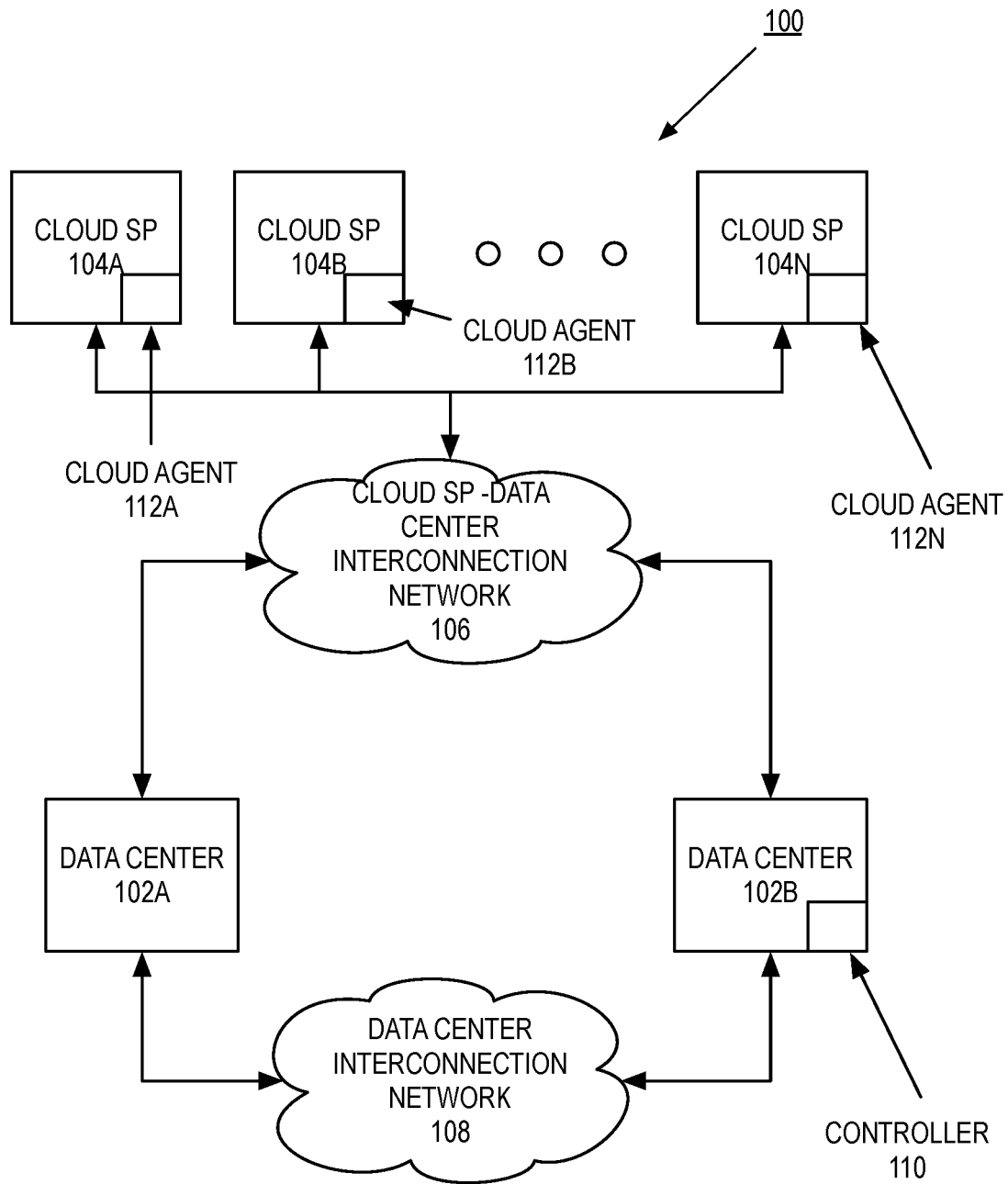
FIG. 1 is a block diagram of one embodiment of a system of multiple data centers communicating with multiple cloud service providers.

A method and apparatus of a device that measures performance of a plurality of cloud service providers is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that measures performance of a plurality of cloud service providers is described. In one embodiment, a device in a data center can deploy one or more cloud agents to one or more cloud service providers that are coupled to this data center. In addition, the device determines which of these cloud service providers to deploy a cloud agent. In this embodiment, a cloud agent can be used to determine performance metrics for the respective cloud service provider. Each of the agents can be a program or hardware module that is used to respond to performance measurement probes from the device.

The device further deploys the cloud agents to the cloud service providers, where the cloud agents are used to measure the performance of the respective cloud service provider. With the deployed cloud agents, the device probes the cloud agents using different tools (e.g., ping, traceroute, address resolution protocol (ARP), and/or other types of tools) to measure these types of performance metrics. For example and in one embodiment, using the cloud agents, the device can measure round-trip time, number of hops, jitter, latency, packet loss, and/or other types of cloud service provider performance metrics associated with each cloud service providers. If a cloud service provider has multiple regions and/or zones within a region, the device can deploy one or more cloud agents and measure the performance metrics for each possible combination of region and zone. With the performance metrics, the device can further display the performance metrics (e.g., in a dashboard).

In one embodiment, by gathering the performance metrics, an enterprise that uses a data center and services from one or more cloud service providers can use these metrics to help determine a cause for a poorly performing service.

FIG. 1 is a block diagram of one embodiment of a system 100 of multiple data centers communicating with multiple cloud service providers. In FIG. 1, the system 100 includes multiple cloud service providers 104A-N coupled to the data centers 102A-B through a cloud service provider data center interconnection network 106. In one embodiment, a cloud service provider 104A-N is a service provider that provides different kinds of on-demand services for different customers using a shared poll of configurable computing resources (e.g., networks, servers, storage, applications, and other equipment and/or services). For example and in one embodiment, the cloud service provider 104A-N can be an AMAZON WEB SERVICES, IBM SMARTCLOUD, MICROSOFT AZURE, and/or any other type of cloud service provider. In one embodiment, each of the cloud service providers 104A-N can provide different services, such as infrastructure as a service (IaaS), platform as a service (PaaS), and software as a service (SaaS). In one embodiment, IaaS provides computers, network infrastructure, and/or storage, whether physical and/or virtual, to a customer. The customer will configure the provided IaaS with specific configurations and/or applications. In another embodiment, PaaS offers a development environment to application developers. The provider typically develops toolkit and standards for development and channels for distribution and payment. In the PaaS models, cloud providers deliver a computing platform, typically including operating system, programming-language execution environment, database, and web server. Application developers can develop and run their software solutions on a cloud platform without the cost and complexity of buying and managing the underlying hardware and software layers. In a further embodiment, SaaS provides on-demand applications and/or services to customers. For example and in one embodiment, SaaS has become a delivery model for many business applications, including office and messaging software, payroll processing software, DBMS software, management software, CAD software, development software, gamification, virtualization, accounting, collaboration, customer relationship management (CRM), management information systems (MIS), enterprise resource planning (ERP), invoicing, human resource management (HRM), talent acquisition, content management (CM), antivirus software, and service desk management. In one embodiment, the data centers 102A-B are coupled together via a data center interconnection network 108. While in one embodiment, the system 100 is illustrated with two data centers 102A-B coupled to N cloud service providers, in alternate embodiments, there can be more or less data centers coupled to more or less cloud service providers.

In one embodiment, each of the data centers 102A-B can house up to thousands of devices, where each of the devices can be a computer system, networking equipment, storage system, or some other type of device used in a data center. Each of the data centers 102A-B may be located in a separate region that is geographically remote from the other data centers 102A-B. For example and in one embodiment, each of the data centers 102A-B may be located in a different region in a country, such as data center 102A may be in San Francisco, and data center 102B may be in New York. In another embodiment, each of the data centers 102A-B may be located in different countries and/or continents, for example, data center 102A may be located in the United States and data center 102C may be located in Europe.

A customer, such as a large enterprise that has their own data center(s) (e.g., data centers 102A-B), may also use one or more services provided by the cloud service providers 104A-N to enhance or supplement the services provided by the customer's data center(s). A problem can arise if the customer uses multiple services from different cloud service provider and one or more of those services. In this embodiment, if one or more of the cloud service providers 104A-N are down or having performance issues can be hard for the enterprise to track down where the performance problem lies. For example and in one embodiment, an enterprise may use cloud service provider 104A for a first service and cloud service providers 104B and 104N for a second service. If this enterprise notices that there is a performance problem (e.g., slow or nonexistent service) for either of the first and second services, it may be difficult for the enterprise to track down whether the problem is within the enterprise's data center 102A-B or within the cloud service providers that are supporting these services.

In one embodiment, the enterprise can store a cloud agent 112A-N on each of the cloud service providers 104A-N, where each of these cloud agents 112A-N can be used to determine performance metrics for the respective cloud service provider 104A-N. In this embodiment, each of the cloud agents 112A-N can be a program or hardware module that is used to respond to performance measurement probes from a controller 110 that resides in one of the data centers. The controller 110 deploys the cloud agents 112A-N to each of the cloud service providers 104A-N. The controller 110 further configures these agents 112A-N as well as configuring the types of performance metrics to be collected and a schedule for the performance metric collection. For example and in one embodiment, the performance metrics can include round-trip time, number of hops, jitter, latency, packet loss, and/or other types of cloud service provider performance metrics. In one embodiment, the controller 110 uses different types of tools (e.g., ping, traceroute, ARP, and/or other types of tools) to measure these types of performance metrics. Furthermore, in one embodiment, there may be a multi-link group between the controller 110 and one or more of the cloud service providers 104A-N. To test these different pathways, the controller 110 can configure each of the performance metric probes with different characteristics so that the packet for this probe can travel long the different pathways in this multi-link group. For example and in one embodiment, the controller 110 can alter the source port used for different ping, traceroute, and/or ARP requests so that these different packets can travel different pathways along the multi-link group. In this example, the controller 110 can send different ping packets with different source ports, either in series or concurrently, where these different ping packets travel along different pathways in a multi-link group. In one embodiment, the controller 110 can be a server, personal computer, server, network element, mobile device (e.g., smartphone, laptop, personal digital assistant, music playing device, gaming device, etc.), and/or any device capable of executing a process. In one embodiment, the network element can be switch, router, hub, bridge, gateway, etc., or any type of device that can allow access to a network. In one embodiment, the network element can be a virtual machine.

In one embodiment, by having these cloud agents 112A-N for each of the corresponding cloud service providers 104A-N, an enterprise can monitor the performance of these cloud service providers 104A-N. In this embodiment, the enterprise can determine if a performance issue with a service provided by the enterprise is due to one of the cloud service providers or to an issue within one of the data centers by using the performance metrics related to the cloud service providers. For example and in one embodiment, if a service for the enterprise uses the data center 102B and cloud service provider 104B and this service is exhibiting poor service, an administrator can use the performance metrics for cloud service provider 104B to determine if the fault for the service performance issue lies with the cloud service provider 104B or the data center 102B.

As described above, a cloud service provider may have data centers in one or more regions. For example and in one embodiment, a cloud service provider can have multiple data centers in different regions in one country (e.g., data centers in New York, Texas, and California), multiple data centers across multiple countries (e.g., data centers in the United States, Europe, Asia, and/or other countries or continents), or combination therein. Each of these regional data centers can be used to provide services for regions local to that data center. In addition and in one embodiment, a data center may further be partitioned into multiple zones, where each zone is a separate isolated location within that region. In this embodiment, the cloud service provider would allow a cloud customer to request resources for a particular region and/or particular zone within that region. Because each of the zones is isolated, performance of one zone may be different than for the performance of another zone for the same cloud service provider. In this embodiment, an enterprise may place a cloud service agent in one of the regions for cloud service provider, and some of the regions, or all of the regions. Furthermore, enterprise may place a cloud service agent in one, some or all of those zones for a particular region of that cloud service provider. In one embodiment, an enterprise may have an agent move from one zone or region to another zone or region, so as to monitor the performance of that cloud service provider over time. In another embodiment, the enterprise may install the cloud agent and have that agent remain in the particular zone and region combination over a longer period of time to measure the performance of that particular zone and region combination for that cloud service provider.

Figure 2:
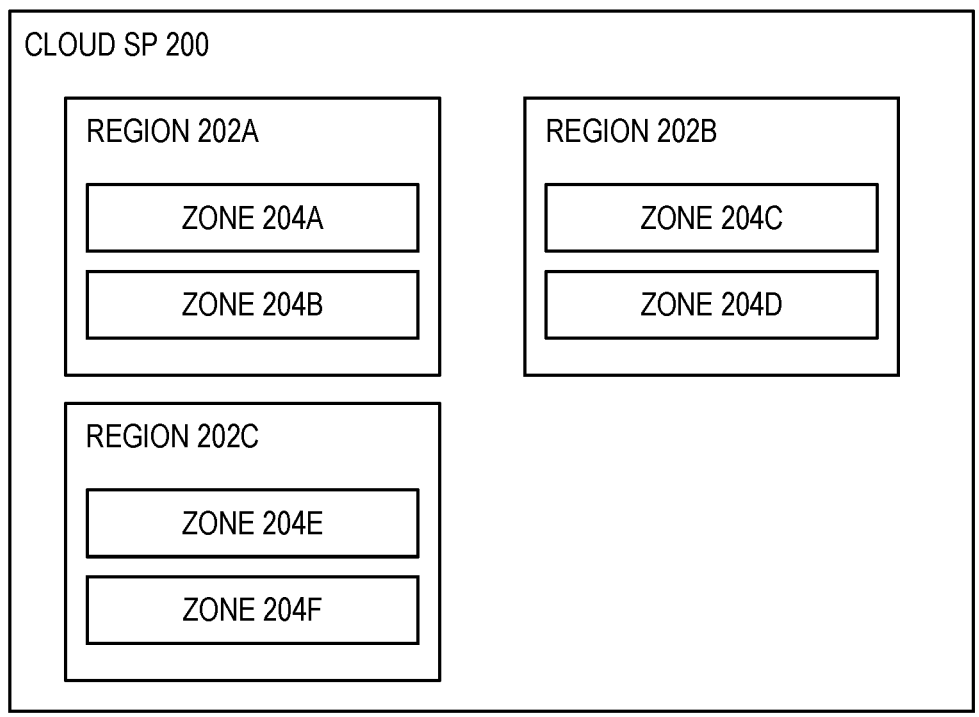
FIG. 2 is a block diagram of one embodiment of a cloud service provider with multiple zones.

FIG. 2 is a block diagram of one embodiment of a cloud service provider 200 with multiple zones. In FIG. 2, the cloud service provider 200 includes three different regions 202A-C. Each of these different regions 202A-C includes different zones. For example and in one embodiment, region 202A includes zones 204A-B, region 202B includes zones 204C-D, and region 202C includes zones 204E-F. While in one embodiment, cloud service provider 200 is illustrated with three different regions 202A-C with each region having 2 different zones, and alternate embodiments, the cloud service provider 200 can have more or less regions, were each of these regions may separately have one or more zones. In one embodiment, with a cloud service provider 200 having multiple regions and one or more of these regions having one or more zones, the enterprise has a choice as to which of these region and zone combinations are to have a cloud agent installed. For example and in one embodiment, if the enterprise is using zone 204B of region 202A to provide one type of service for the enterprise (e.g., providing one type of service for customers local to region 202A) and is using zone 204E for region 202C to provide another type of service for the enterprise (e.g., providing a different service to all customers of that enterprise or the same type of service for customers local to region 202C), the enterprise may install cloud agents in each of zone 204B and zone 204E so that the enterprise can monitor the performance of each of these zones. Alternatively, the enterprise may install a cloud agent in any of those zones for region that the enterprise is using.

Figure 3:
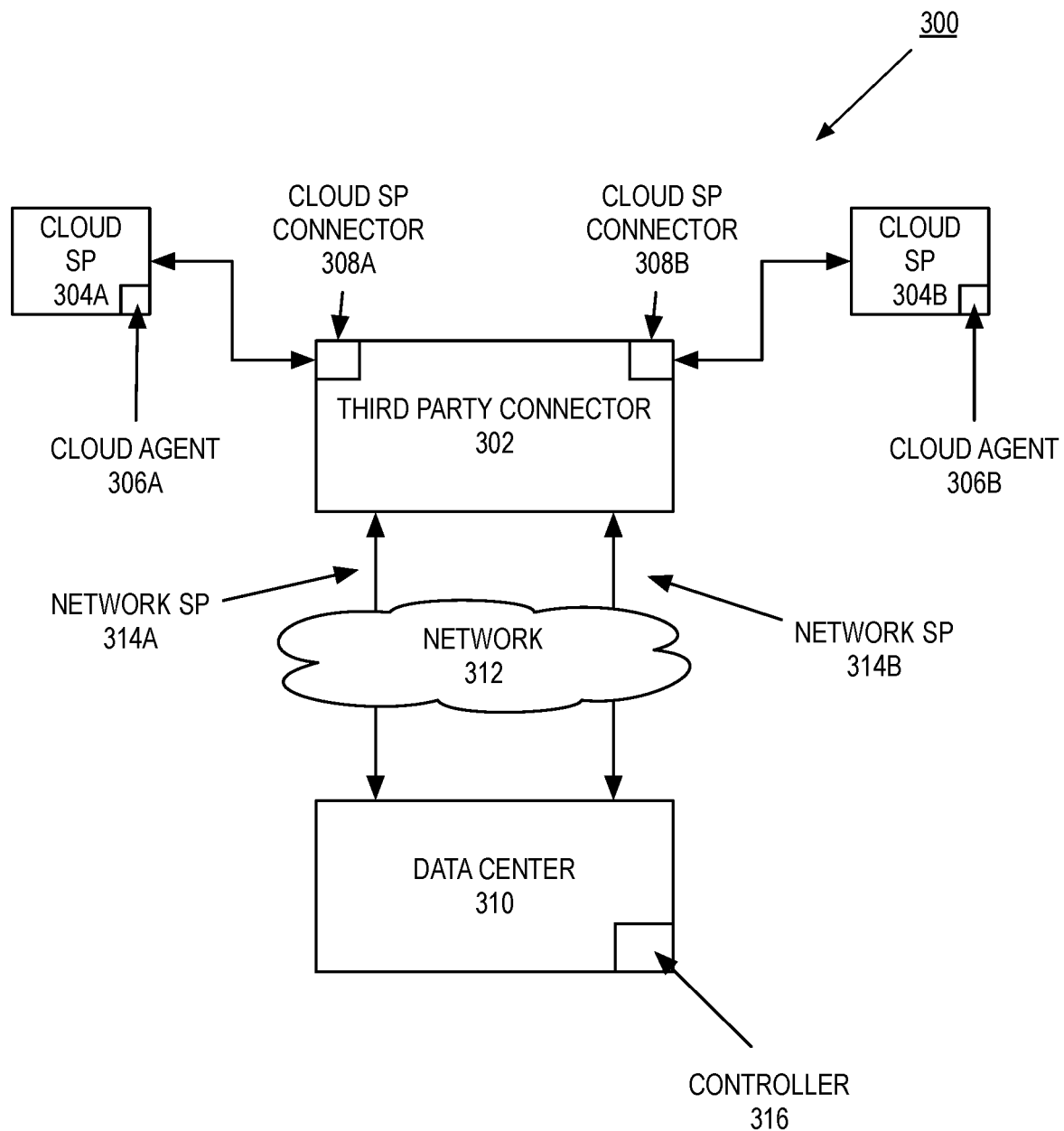
FIG. 3 is a block diagram of one embodiment of a system of multiple data centers communicating with multiple cloud service providers via multiple network service providers and a third party connecting service.

In one embodiment, performance along the network path is only as good as the slowest link along that path. In this embodiment, a cloud service provider may report that the performance of this cloud service provider is fine, where a cloud agent indicates that the performance of that cloud service provider is poor. In this example, the performance may not be due to the cloud service provider itself but may be due to one of the connections and/or services along that network path between the cloud service provider and the data center. For example and in one embodiment, the performance issue could be with a third-party connector that connects the cloud service provider to a network, the intervening network, or a network service provider that provides network access for the data center to the intervening network. FIG. 3 is a block diagram of one embodiment of a system 300 of a data center 310 communicating with multiple cloud service providers via multiple network service providers and a third party connecting service. In FIG. 3, system 300 includes two cloud service providers 304A-B that couple to the data center 310 via a third-party connector 302, network 312, and network service providers 314A-B. In one embodiment, the cloud service providers 304A-B and data center 310 are the cloud service providers and data center as described in FIG. 1 above. Furthermore, the data center 310 includes a controller 316, which can be the controller 110 as described in FIG. 1 above. In addition, the third-party connector 302 is a network service that provides network access for the cloud service providers 304A-B to the network 312. In one embodiment, the third-party connector 302 is a high-speed network service that includes connectors 308A-B for each of the respective cloud service providers 304A-B. The network 312 is a network that provides wide-area access for the cloud service providers 304A-B and/or data center 310 (e.g., the Internet). The network service providers 314A-B are service providers that provide network access for the data center 310 to the network 312. In one embodiment, each of the closed service providers 304A-B, third-party connector 302, network service providers 314A-B, and network 312 may separately have performance issues that would lead to an overall performance issue between one of the cloud service providers 304A-B and data center 310. An enterprise can use an installed cloud agent 306A-B to help determine root cause of a performance issue that would be indicated by one of the cloud agents 306A-B.

In one embodiment, if the cloud agent 306A indicates a performance issue with the cloud service provider 304A and the cloud service provider 304A reports that performance is fine for this cloud service provider, an enterprise can deduce that the performance problem is with the third-party connector 308, network 312, or one of the network service providers 314A-B. The enterprise can further probe the cloud agent 306A using both of the network service providers 314A-B to see if the performance problem is with one or both of the network service providers 314A-B. If the problem is with one of the network service providers (e.g., network service provider 314A but not network service provider 314B), the enterprise can deduce that the performance problem is with the network service provider 314A. If the performance problem is different from either network service provider, the enterprise can deduce that the problem lies either with the network 312 or the third-party connector 302. Furthermore, if the enterprise has a cloud agent installed on another cloud service provider (e.g., cloud agent 306B on cloud service provider 304B) and this cloud agent 306B does not indicate a performance problem, the enterprise can deduce that the performance is with the cloud service provider connector 308A and not the network 312. Thus, by using one or more cloud agents on one or more cloud service providers, and enterprise may be able to deduce where the fault lies for a poor performance indicated by these cloud agents.

Figure 4:
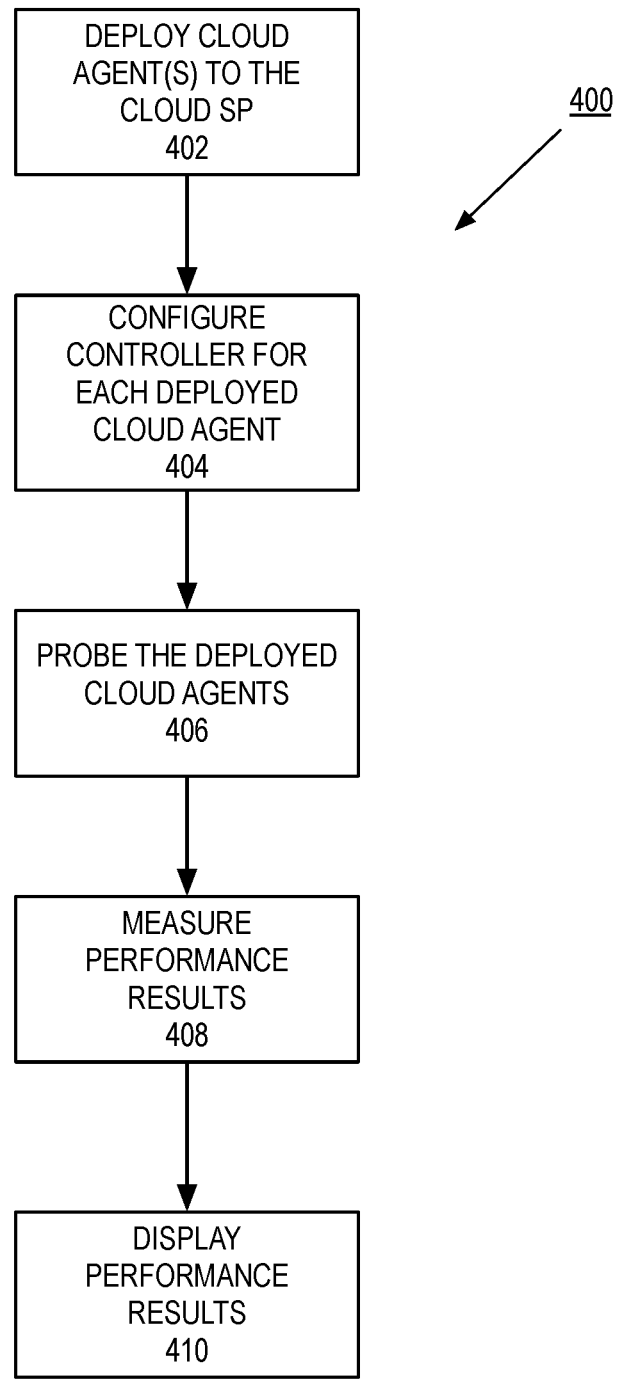
FIG. 4 is a flow diagram of one embodiment of a process to measure the performance of the multiple cloud service providers.

FIG. 4 is a flow diagram of one embodiment of a process 400 to measure the performance of the multiple cloud service providers. In one embodiment, process 400 is performed by the controller to measure the performance of multiple cloud service providers, such as controller 110 as described in FIG. 1 above. In FIG. 4, process 400 begins by the point cloud agents to cloud service providers at block 402. In one embodiment, process 400 can deploy one or more cloud agents for each cloud service provider. Process 400, for example, can deploy one cloud agent for a cloud service provider, one cloud agent for each of the regions of that cloud service provider, or can deploy cloud agent for each zone and region combination of the cloud service provider as described in FIGS. 1 and 2 above. At block 404, process 400 configures the controller for each of the deployed cloud agents. In one embodiment, process 400 configures the controller for each cloud agent as to what type of tests are to be performed (e.g., ping, traceroute, ARP, any other types of tests, and/or a combination therein) and/or how often these tests are to be performed (e.g., every second, minute, or another times period on a static or dynamic scale). Process 400 probes the deployed cloud agents at block 406. In one embodiment, process probes each of the cloud agents by sending network test traffic to each of these cloud agents (e.g., ping packets, traceroute packets, ARP packets, and/or any other type of network test traffic). Furthermore, process 400 can probe each cloud agent by varying the packet characteristics of the transmitted packets so as to test out different multi-link groups along the path.

At block 408, process 400 measures the performance for each of the cloud agents. In one embodiment, process 400 measures these performances by receiving return packets from the cloud agents giving the indications of the performance measurement. For example and in one embodiment, if process 400 pings a cloud agent, the cloud agent would return a packet that includes round-trip time and a sequence number, which can be used to determine if there is any packet loss. As another example and embodiment, if process 400 uses traceroute as a diagnostic, process 400 can measure a path that a packet would take to and from the cloud agent, round-trip time, and the number of hops for that path. At block 410, process 400 displays the performance results. In one embodiment, process 400 can display the results of in a dashboard for each of the cloud service providers. In this embodiment, for each cloud service provider, process 400 can display the results for each cloud agent corresponding to that cloud service provider. While in one embodiment, an enterprise can use process 400 to determine the display results for cloud service providers that are being used by that enterprise, in alternate embodiments, an enterprise that does necessarily depend on the cloud service provider for immediate services may set up cloud agents on well-known cloud service providers (and possibly for each region and/or zone of that cloud service provider), where the results for these cloud agents are published on a publicly accessible website. In an alternative embodiment, if the performance for one or more of the cloud agents falls below a threshold, an alarm and/or message may be sent so as to notify an administrator of this condition.

Figure 5:
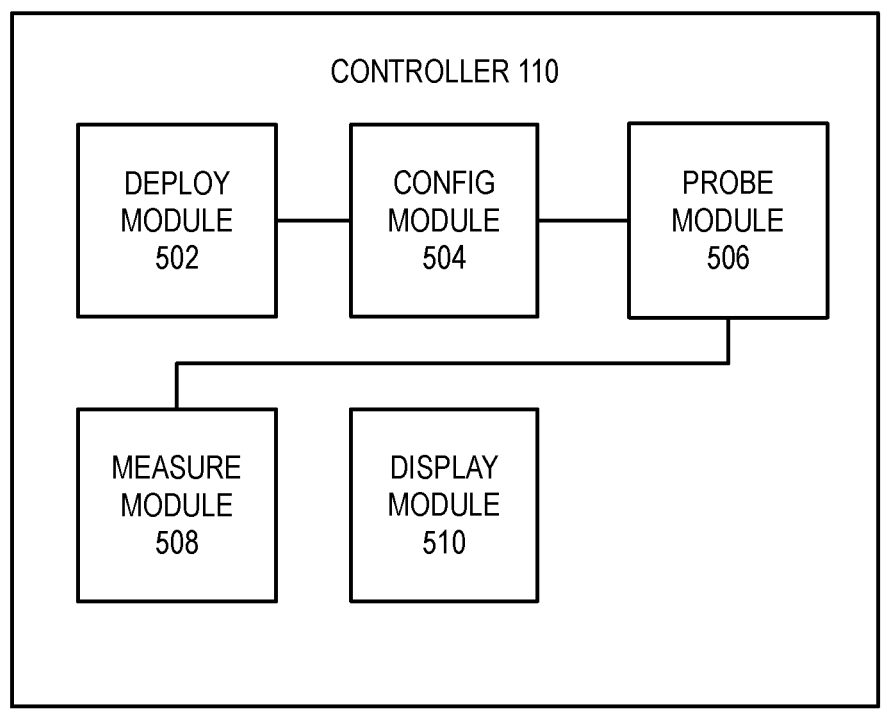
FIG. 5 is a block diagram of one embodiment of a cloud performance module that measures the performance of the multiple cloud service providers.

FIG. 5 is a block diagram of one embodiment of a controller 110 that measures the performance of the multiple cloud service providers. In FIG. 5, the controller 110 includes a deploy module 502, configure module 504, probe module 506, measure module 508, and display module 510. In one embodiment, the deploy module 502 deploys cloud agent(s) to one or more cloud service providers as described in FIG. 4, block 402. The configure module 504 configures the controllers to probe the cloud agents as described in FIG. 4, block 404. The probe module 506 probes the cloud agents as described in FIG. 4, block 406. The measure module 508 measures the cloud agents response as described in FIG. 4, block 408. The display module 510 displays the measurement results as described in FIG. 4, block 410.

Figure 6:
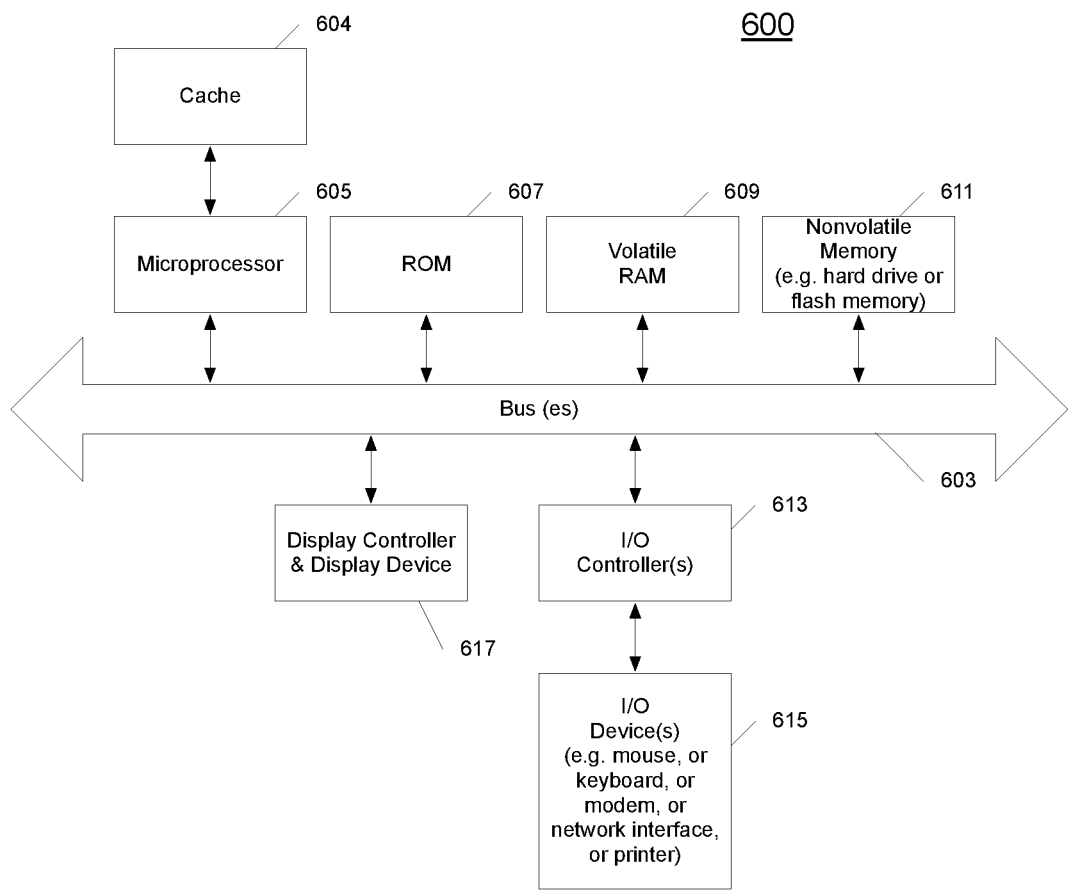
FIG. 6 illustrates one example of a typical computer system, which may be used in conjunction with the embodiments described herein.

FIG. 6 shows one example of a data processing system 600, which may be used with one embodiment of the present invention. For example, the system 600 may be implemented including a controller 110 as shown in FIG. 1 above. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 617 and to peripheral devices such as input/output (I/O) devices which may be mice, keyboards, modems, network interfaces, printers and other devices which are well known in the art. In one embodiment, the system 600 includes a plurality of network interfaces of the same or different type (e.g., Ethernet copper interface, Ethernet fiber interfaces, wireless, and/or other types of network interfaces). In this embodiment, the system 600 can include a forwarding engine to forward network date received on one interface out another interface.

Typically, the input/output devices 615 are coupled to the system through input/output controllers 613. The volatile RAM (Random Access Memory) 609 is typically implemented as dynamic RAM (DRAM), which requires power continually in order to refresh or maintain the data in the memory.

The mass storage 611 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Figure 7:
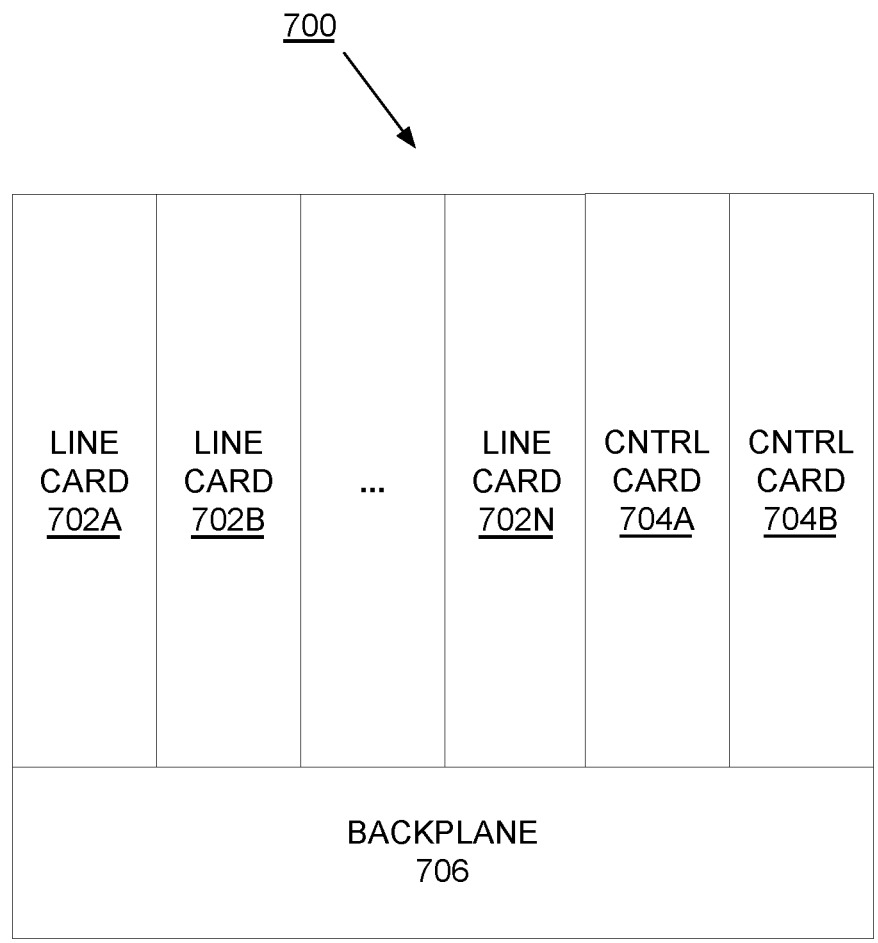
FIG. 7 is a block diagram of one embodiment of an exemplary network element that measures the performance of the multiple cloud service providers.

FIG. 7 is a block diagram of one embodiment of an exemplary network element 700 that measures the performance of the multiple cloud service providers. In FIG. 7, the backplane 706 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., measuring the performance of the multiple cloud service providers). In one embodiment, the controller cards 704A-B measure the performance of the multiple cloud service providers as described in FIGS. 1, 2 and 4. In this embodiment, one or both of the controller cards 704A-B include pause watchdog module, such as the pause watchdog module 72 as described in FIG. 1B above. It should be understood that the architecture of the network element 700 illustrated in FIG. 7 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "deploying," "determining," "configuring," "probing," "measuring," "sending," "setting," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to measure performance of a plurality of cloud service providers, the method comprising:
    deploying a plurality of cloud agents to the plurality of cloud service providers, wherein a cloud service provider is a service provider that provides different kinds of on-demand services for different customers using a shared pool of configurable computing resources;
    setting a controller to measure the performance of each of the plurality of cloud service providers using each of the plurality of cloud agents;
    probing each of the plurality of cloud service providers by sending probe data to each of the plurality of cloud agents, wherein the probe data comprises test traffic from the controller to the plurality of cloud agents;
    receiving response data from each of plurality of cloud agents, wherein the response data is indicative of performance measurements of the plurality of cloud service providers; and
    measuring the performance for each of the plurality of cloud service providers using the response data.

2. The non-transitory machine-readable medium of claim 1, wherein the deploying comprises:
    for each of the plurality of cloud agents,
    determining a zone of one of the plurality of cloud service providers, and
    deploying that cloud agent to the zone.

3. The non-transitory machine-readable medium of claim 2, wherein a zone of a cloud service provider is an isolated location within a region of the cloud service provider.

4. The non-transitory machine-readable medium of claim 2, wherein multiple cloud agents are deployed to multiple zones for one of the plurality of cloud service providers.

5. The non-transitory machine-readable medium of claim 1, wherein the probing comprises:
    sending data that is selected from the group consisting of a ping packet, an address resolution protocol packet, and a traceroute packet.

6. The non-transitory machine-readable medium of claim 1, wherein a performance measurement is selected from the group consisting of round trip time, number of hops, jitter, latency, and packet loss.

7. The non-transitory machine-readable medium of claim 1, wherein the setting of the controller comprises:
    setting a range of different source port numbers for a plurality of packet, wherein the different source port numbers are used to provide different paths of a multipath network segment.

8. The non-transitory machine-readable medium of claim 1, further comprising:
    displaying the performance measurements for each of the plurality of cloud service providers.

9. The non-transitory machine-readable medium of claim 8, wherein the displaying comprises:
    displaying a map of the plurality of cloud service providers by the regions that each of the plurality of cloud service providers resides in and an indication of a performance measurement for that cloud service providers.

10. A method to measure performance of a plurality of cloud service providers, the method comprising:
    deploying a plurality of cloud agents to the plurality of cloud service providers, wherein a cloud service provider is a service provider that provides different kinds of on-demand services for different customers using a shared pool of configurable computing resources;
    setting a controller to measure the performance of each of the plurality of cloud service providers using each plurality of cloud agents;
    probing each of the plurality of cloud service providers by sending probe data to each of the plurality of cloud agents, wherein the probe data comprises test traffic from the controller to the plurality of cloud agents;
    receiving response data from each of plurality of cloud agents, wherein the response data is indicative of performance measurements of the plurality of cloud service providers; and
    measuring the performance for each of the plurality of cloud service providers using the response data.

11. The method of claim 10, wherein the deploying comprises:
    for each of the plurality of cloud agents,
    determining a zone of one of the plurality of cloud service providers, and
    deploying that cloud agent to the zone.

12. The method of claim 11, wherein a zone of a cloud service provider is an isolated location within a region of the cloud service provider.

13. The method of claim 11, wherein multiple cloud agents are deployed to multiple zones for one of the plurality of cloud service providers.

14. The method of claim 10, wherein the probing comprises:
    sending data that is selected from the group consisting of a ping packet, an address resolution protocol packet, and a traceroute packet.

15. The method of claim 10, wherein a performance measurement is selected from the group consisting of round trip time, number of hops, jitter, latency, and packet loss.

16. The method of claim 10, wherein the setting of the controller comprises:
    setting a range of different source port numbers for a plurality of packet, wherein the different source port numbers are used to provide different paths of a multipath network segment.

17. The method of claim 10, further comprising:
displaying the performance measurements for each of the plurality of cloud service providers.

18. A device to measure performance of a plurality of cloud service providers, the device comprising:
a processor;
a memory coupled to the processor though a bus; and
a process executed from the memory by the processor that causes the processor to deploy a plurality of cloud agents to the plurality of cloud service providers, wherein a cloud service provider is a service provider that provides different kinds of on-demand services for different customers using a shared pool of configurable computing resources, configure a controller to measure the performance of each of the plurality of cloud service providers using each of the plurality of cloud agents, probe each of the plurality of cloud service providers by sending probe data to each of the plurality of cloud service providers, wherein the probe data comprises test traffic from the controller to the plurality of cloud service providers, receive response data from each of plurality of cloud agents, wherein the response data is indicative of performance measurements of the plurality of cloud service providers, and measure the performance for each of the plurality of cloud service providers using the response data.

\* \* \* \* \*